US011631324B2

United States Patent
Higuchi et al.

(10) Patent No.: US 11,631,324 B2
(45) Date of Patent: Apr. 18, 2023

(54) SYSTEMS AND METHODS FOR COLLABORATIVE INTERSECTION MANAGEMENT

(71) Applicant: Toyota Motor Engineering & Manufacturing North America, Inc., Plano, TX (US)

(72) Inventors: Takamasa Higuchi, Mountain View, CA (US); Seyhan Ucar, Mountain View, CA (US); Chang-Heng Wang, Mountain View, CA (US); Onur Altintas, Mountain View, CA (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 329 days.

(21) Appl. No.: 16/997,472

(22) Filed: Aug. 19, 2020

(65) Prior Publication Data

US 2022/0058945 A1 Feb. 24, 2022

(51) Int. Cl.
*G08G 1/09* (2006.01)
*G08G 1/01* (2006.01)
(Continued)

(52) U.S. Cl.
CPC ........... *G08G 1/09* (2013.01); *B60W 30/0956* (2013.01); *B60W 30/18159* (2020.02);
(Continued)

(58) Field of Classification Search
CPC ...... G08G 1/09; G08G 1/0112; G08G 1/0145; H04W 4/44; H04W 4/46; H04W 4/20;
(Continued)

(56) References Cited

U.S. PATENT DOCUMENTS 7,639,159 B2    12/2009  McNew et al.
8,587,418 B2 *  11/2013  Mochizuki ............. B60Q 9/008
                                                   340/995.13
(Continued)

OTHER PUBLICATIONS

Zhang et al., "Virtual Traffic Lights: System Design and Implementation", found at: arXiv:1807.01633v1 [cs.NI] Jul. 4, 2018.
(Continued)

*Primary Examiner* — Peter D Nolan
*Assistant Examiner* — Wae L Louie
(74) *Attorney, Agent, or Firm* — Christopher G. Darrow; Darrow Mustafa PC

(57) ABSTRACT

System, methods, and other embodiments described herein relate to improving right-of-way determinations at an intersection. In one embodiment, a method includes acquire, in a lead vehicle that is a cloud leader of a micro-cloud, observations about the intersection for a set of vehicles including at least one remote vehicle. The set of vehicles are approaching the intersection. The remote vehicle and the lead vehicle are members of the micro-cloud. The method includes deriving an assignment of right-of-ways indicating an order about how the set of vehicles may proceed through the intersection. The method includes providing the assignment to at least the remote vehicle to control right-of-way at the intersection.

20 Claims, 8 Drawing Sheets

(51) Int. Cl.
  *H04W 84/20* (2009.01)
  *H04W 4/44* (2018.01)
  *B60W 30/18* (2012.01)
  *B60W 30/095* (2012.01)
  *B60W 60/00* (2020.01)
  *H04W 4/46* (2018.01)
  *H04W 84/00* (2009.01)

(52) U.S. Cl.
  CPC ......... *B60W 60/001* (2020.02); *G08G 1/0112* (2013.01); *G08G 1/0145* (2013.01); *H04W 4/44* (2018.02); *H04W 4/46* (2018.02); *H04W 84/20* (2013.01); *B60W 2554/40* (2020.02); *H04W 84/005* (2013.01)

(58) Field of Classification Search
  CPC ....... B60W 30/18159; B60W 30/0956; B60W 60/001
  See application file for complete search history.

(56) References Cited

U.S. PATENT DOCUMENTS

| | | | |
|---|---|---|---|
| 8,903,640 B2* | 12/2014 | Caminiti | G08G 1/0104 340/901 |
| 9,459,623 B1 | 10/2016 | Raghu et al. | |
| 9,818,299 B1* | 11/2017 | Jammoussi | G08G 1/161 |
| 10,037,693 B2* | 7/2018 | Ryu | G08G 1/095 |
| 10,334,405 B2* | 6/2019 | Altintas | H04W 4/02 |
| 10,587,998 B2* | 3/2020 | Altintas | H04L 67/10 |
| 11,046,317 B2* | 6/2021 | Parasuram | B60W 60/001 |
| 11,373,521 B2* | 6/2022 | Morris | G08G 1/096725 |
| 2010/0060483 A1* | 3/2010 | McNew | G08G 1/164 340/907 |
| 2010/0100324 A1 | 4/2010 | Caminiti et al. | |
| 2010/0198513 A1 | 8/2010 | Zeng et al. | |
| 2018/0160333 A1 | 6/2018 | Patil et al. | |
| 2019/0132709 A1* | 5/2019 | Graefe | G08G 1/096716 |
| 2019/0132819 A1* | 5/2019 | Tseng | H04W 4/80 |
| 2019/0222652 A1* | 7/2019 | Graefe | H04L 67/12 |
| 2019/0312779 A1* | 10/2019 | Magzimof | H04M 11/08 |
| 2019/0318620 A1* | 10/2019 | Yang | G08G 1/164 |
| 2019/0347933 A1 | 11/2019 | Zhang et al. | |
| 2020/0081992 A1* | 3/2020 | Lynch | G06F 9/5027 |
| 2020/0153902 A1* | 5/2020 | Higuchi | H04L 67/1097 |
| 2020/0167241 A1 | 5/2020 | Higuchi et al. | |
| 2020/0193811 A1* | 6/2020 | Zagajac | G08G 1/161 |
| 2021/0199804 A1* | 7/2021 | Hamaguchi | G01S 17/88 |
| 2021/0253129 A1* | 8/2021 | Williams | B60W 60/0018 |
| 2021/0316759 A1* | 10/2021 | Ucar | G06F 9/5072 |
| 2022/0036728 A1* | 2/2022 | Ucar | G08G 1/0141 |
| 2022/0058945 A1* | 2/2022 | Higuchi | G08G 1/0112 |
| 2022/0089162 A1* | 3/2022 | Ucar | B60W 30/18159 |
| 2022/0277647 A1* | 9/2022 | Guo | G06T 19/00 |

OTHER PUBLICATIONS

Tonguz, "How vehicle-to-vehicle communication could replace traffic lights and shorten commutes", found at: https://spectrum.ieee.org/transportation/infrastructure/how-vehicletovehicle-communication-could-replace-traffic-lights-and-shorten-commutes (Sep. 25, 2018).

Virtual Traffic Lights, found at: www.virtualtrafficlights.com (accessed Dec. 24, 2019).

* cited by examiner

SYSTEMS AND METHODS FOR COLLABORATIVE INTERSECTION MANAGEMENT

TECHNICAL FIELD

The subject matter described herein relates, in general, to improving intersection management, and, more particularly, to using a micro-cloud to acquire information about vehicles approaching an intersection and collaboratively determine right-of-ways among the vehicles.

BACKGROUND

As vehicles have become ubiquitous in daily life, expectations about safety and comfort of the driving experience have risen. For example, many vehicles may integrate new technologies, such as connected features and driving assistance systems, to facilitate improving safety, ease of operation, and so on. Yet, various difficulties may persist even though the vehicles may be capable of advanced functions, such as automated control. For example, in the context of intersections (e.g., four-way stops) that are not controlled by an explicit traffic signal, automated functions may encounter difficulties in determining which vehicle has the right-of-way to proceed through the intersection. The difficulty may arise from issues involving perceiving another vehicle approaching the intersection, occlusions, and so on. In any case, without a clear determination of right-of-way at the intersection, the vehicles may encounter standoffs or dangerous circumstances in which a vehicle proceeds out of turn.

SUMMARY

In one embodiment, example systems and methods relate to a manner of improving the determination of right-of-ways between vehicles at an intersection. As previously noted, the more vehicles integrate advanced technologies, such as automated driving functions, the safer vehicles can become; however, various difficulties may arise according to the new technology, including difficulties with determining right-of-ways at intersections without a traffic signal.

Therefore, in one or more embodiments, an inventive system is disclosed that improves how vehicles determine right-of-ways at intersections. For example, in at least one approach, the inventive system employs an ad hoc network between vehicles at and/or near an intersection. That is, as vehicles move into an area around an intersection, the vehicles form a communication network, which is referred to herein as a micro-cloud. Of course, because the presence of any given vehicle within the area of the intersection is temporary, membership in the micro-cloud and the formation of the micro-cloud is dynamic.

For example, a micro-cloud leader (e.g., a vehicle that is already a member of the micro-cloud) may broadcast a beacon that announces the presence of the micro-cloud to approaching vehicles. Thus, an approaching vehicle may then join the micro-cloud so that the new vehicle can communicate about the intersection with members of the micro-cloud. The micro-cloud members are, in general, connected vehicles that are approaching the intersection or have recently passed through the intersection. The micro-cloud permits the vehicles to communicate about positions and expected arrival times at the intersection in order to provide a basis for determining right-of-ways.

Accordingly, members of the micro-cloud may communicate information to other members, such as current positions and trajectories. In a further aspect, the micro-cloud members may also communicate observations about other vehicles, including micro-cloud members and non-connected vehicles. Therefore, the micro-cloud members acquire information about the other vehicles and compute arrival times at the intersection. The arrival times are indicative of which vehicle has the right-of-way to proceed where the order of arrival controls which vehicle may proceed first. To ensure consensus among the micro-cloud members, a micro-cloud leader derives an assignment of the right-of-ways according to provisional orderings received from each micro-cloud member. Thus, the micro-cloud leader may use the provisional orders specifying right-of-ways to derive final right-of-way assignments according to majority voting by the micro-cloud members or as verification of a determination by the cloud leader.

In any case, the micro-cloud leader may then communicate the assignment of right-of-ways for the micro-cloud members and observed non-connected vehicles back to the micro-cloud members in order to control the order that the vehicles may proceed through the intersection. In this way, the vehicles do not need to independently determine the right-of-ways but rather determine the right-of-ways as a group to provide the right-of-ways as a consensus and thereby improve the right-of-way determination.

In one embodiment, an intersection system for improving right-of-way determinations at an intersection is disclosed. The intersection system includes one or more processors and a memory communicably coupled to the one or more processors. The memory stores a sensor module including instructions that when executed by the one or more processors cause the one or more processors to acquire, in a lead vehicle that is a cloud leader of a micro-cloud, observations about the intersection for a set of vehicles including at least one remote vehicle. The set of vehicles are approaching the intersection. The remote vehicle and the lead vehicle are members of the micro-cloud. The memory stores a management module including instructions that when executed by the one or more processors cause the one or more processors to derive an assignment of right-of-ways indicating an order about how the set of vehicles may proceed through the intersection. The management module includes instructions to provide the assignment to at least the remote vehicle to control right-of-way at the intersection.

In one embodiment, a non-transitory computer-readable medium for improving right-of-way determinations at an intersection and including instructions that, when executed by one or more processors, cause the one or more processors to perform one or more functions is disclosed. The instructions include instructions to acquire, in a lead vehicle that is a cloud leader of a micro-cloud, observations about the intersection for a set of vehicles including at least one remote vehicle. The set of vehicles are approaching the intersection. The remote vehicle and the lead vehicle are members of the micro-cloud. The instructions include instructions to derive an assignment of right-of-ways indicating an order about how the set of vehicles may proceed through the intersection. The instructions include instructions to provide the assignment to at least the remote vehicle to control right-of-way at the intersection.

In one embodiment, a method for improving right-of-way determinations at an intersection is disclosed. In one embodiment, the method includes acquiring, in a lead vehicle that is a cloud leader of a micro-cloud, observations about the intersection for a set of vehicles including at least one remote vehicle. The set of vehicles are approaching the intersection. The remote vehicle and the lead vehicle are members of the micro-cloud. The method includes deriving an assignment of right-of-ways indicating an order about how the set of vehicles may proceed through the intersection. The method includes providing the assignment to at least the remote vehicle to control right-of-way at the intersection.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
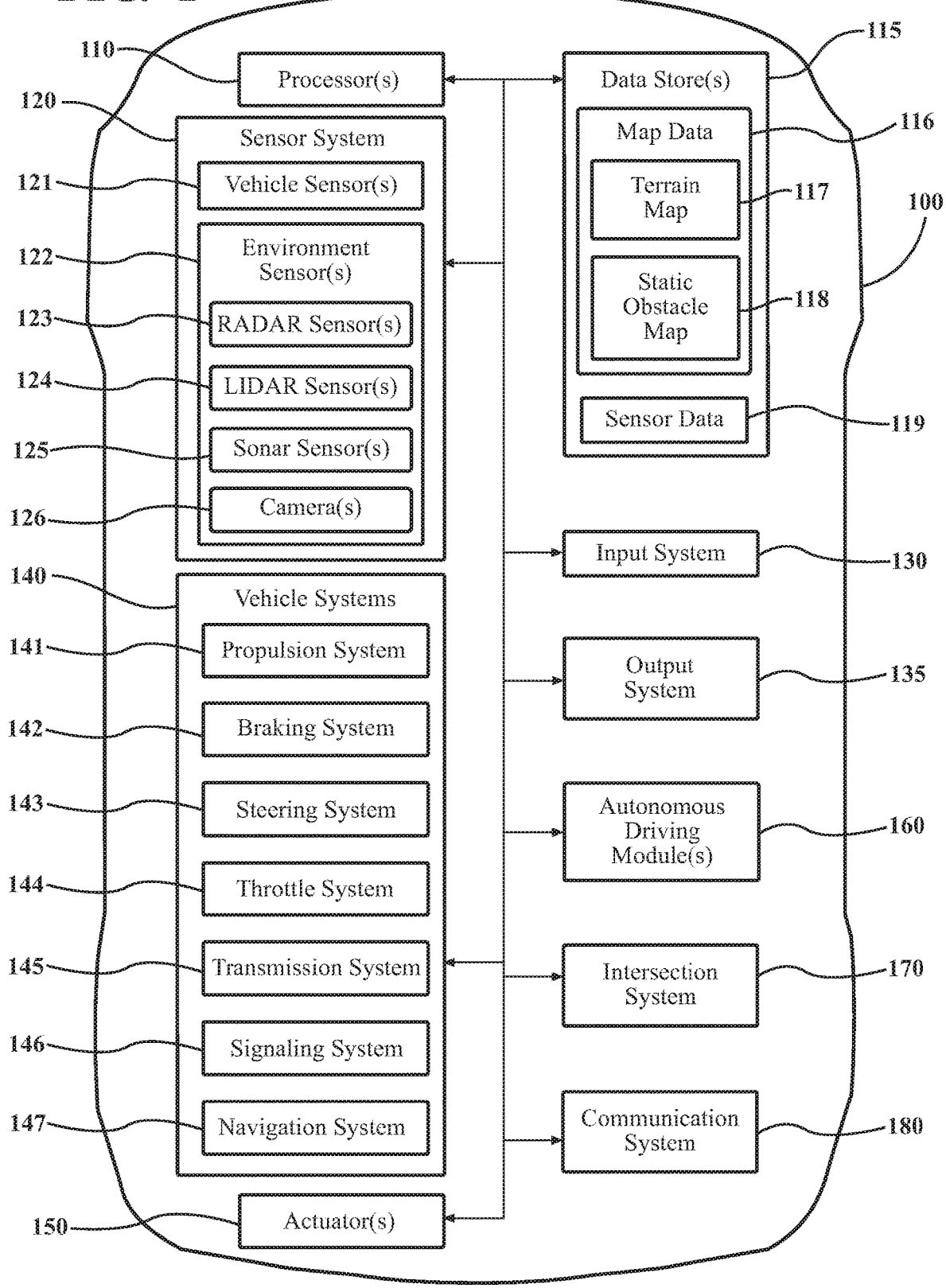
FIG. 1 illustrates one embodiment of a vehicle within which systems and methods disclosed herein may be implemented.

Systems, methods, and other embodiments associated with a manner of improving intersection management through right-of-way determinations using a micro-cloud are disclosed herein. As previously noted, the more vehicles integrate advanced technologies, such as automated driving functions, the safer vehicles can become; however, various difficulties may arise according to the new technology, including difficulties with determining which vehicle has the right-of-way at an intersection.

Therefore, in one or more embodiments, an intersection system is disclosed that improves how vehicles determine right-of-ways. The intersection system, in one embodiment, provides for facilitating communication between vehicles in an area of an intersection through the use of an ad hoc network. As vehicles move into an area around an intersection, the vehicles form a micro-cloud that is a wireless communication network. Membership in the micro-cloud and the formation of the micro-cloud is dynamic and generally includes adding new members as vehicles travel into the area and removing vehicles from the micro-cloud as the vehicles progress out of the intersection. Thus, the micro-cloud is continuously morphing according to a progression of vehicles. In various circumstances, the micro-cloud may become dormant when no vehicles are present and re-awaken when new vehicles progress into the area of the intersection, re-establishing communications that form the micro-cloud.

To manage the micro-cloud, the micro-cloud leader (e.g., a micro-cloud member that assumes an administrative role) may enroll new members (i.e., approaching vehicles) and provide assignments of right-of-ways to micro-cloud members. For example, the micro-cloud leader can, in one or more approaches, broadcast a beacon that announces the presence of the micro-cloud to approaching vehicles. Thus, an approaching vehicle may then join the micro-cloud upon receiving the beacon in order to participate in the right-of-way determinations. The micro-cloud members are, in general, connected vehicles that are approaching the intersection or have recently passed through the intersection. Moreover, as member vehicles progress out of the area, the micro-cloud leader removes the vehicles from the micro-cloud. Similarly, the micro-cloud leader hands off the leader role to another vehicle in order to maintain the micro-cloud. In this way, the micro-cloud permits the vehicles to communicate about positions and expected arrival times at the intersection in order to provide a basis for determining right-of-ways even though the group membership is consistently changing due to the dynamic nature of traffic.

Accordingly, members of the micro-cloud generally function to communicate information to other members that is relevant for determining right-of-ways. In one or more arrangements, the micro-cloud members may provide current positions and trajectory information. In a further aspect, the cloud members may also communicate observations about other vehicles, including cloud members and non-connected vehicles. The cloud members use the information to compute arrival times at the intersection for the separate vehicles approaching the intersection. The arrival times are indicative of which vehicle has the right-of-way to proceed where the order of arrival controls the order of which vehicle may proceed. To ensure consensus among the cloud members, a cloud leader derives an assignment of the right-of-ways according to provisional orderings received from each cloud member. Thus, the cloud leader may use the provisional orders specifying right-of-ways to derive final right-of-way assignments according to, for example, majority voting by the micro-cloud members or as verification of a determination by the micro-cloud leader.

In any case, the micro-cloud leader may then communicate the assignment of right-of-ways for the micro-cloud members and observed non-connected vehicles back to the micro-cloud members in order to control the order that the vehicles may proceed through the intersection. In this way, the vehicles avoid independently determining and rather determine the right-of-ways as a group to provide the right-of-ways as a consensus, thereby improving the right-of-way determination.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any device that, for example, transports passengers. In various approaches, the vehicle 100 may be an automated vehicle. As used herein, an automated vehicle refers to a vehicle with at least some automated driving functions. Thus, the vehicle 100 may operate autonomously, semi-autonomously, or with the assistance of various advanced driving assistance systems (ADAS). Further, the vehicle 100 is generally a connected vehicle that is capable of communicating wirelessly with other devices, such as other connected vehicles. Moreover, in yet further approaches, the noted systems and methods disclosed herein may be implemented as part of other entities, such as electronic devices that are not associated with a particular form of transport but are instead embedded as part of a mobile electronic device that can be, for example, carried by an individual and that may function independently or in concert with additional systems (e.g., sensors) of other devices.

In any case, the vehicle 100 also includes various elements. It will be understood that, in various embodiments, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances. For example, as discussed, one or more components of the disclosed system can be implemented within the vehicle 100, while further components of the system are implemented within a micro-cloud environment, as discussed further subsequently.

Some of the possible elements of the vehicle 100 are shown in FIG. 1 and will be described along with subsequent figures. However, a description of many of the elements in FIG. 1 will be provided after the discussion of FIGS. 2-8 for purposes of the brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements. In any case, as illustrated in the embodiment of FIG. 1, the vehicle 100 includes an intersection system 170 that is implemented to perform methods and other functions as disclosed herein relating to right-of-way determinations in a micro-cloud.

Moreover, the intersection system 170, as provided for within the vehicle 100, functions in cooperation with a communication system 180. In one embodiment, the communication system 180 communicates according to one or more communication standards. For example, the communication system 180 can include multiple different antennas/transceivers and/or other hardware elements for communicating at different frequencies and according to respective protocols. The communication system 180, in one arrangement, communicates via a communication protocol, such as a WiFi, DSRC, V2I, V2V, or another suitable protocol for communicating between the vehicle 100 and other entities in the micro-cloud. Moreover, the communication system 180, in one arrangement, further communicates according to a protocol, such as global system for mobile communication (GSM), Enhanced Data Rates for GSM Evolution (EDGE), Long-Term Evolution (LTE), 5G, or another communication technology that provides for the vehicle 100 communicating with various remote devices (e.g., edge server). In any case, the intersection system 170 can leverage various wireless communication technologies to provide communications to other entities, such as members of the micro-cloud.

Figure 2:
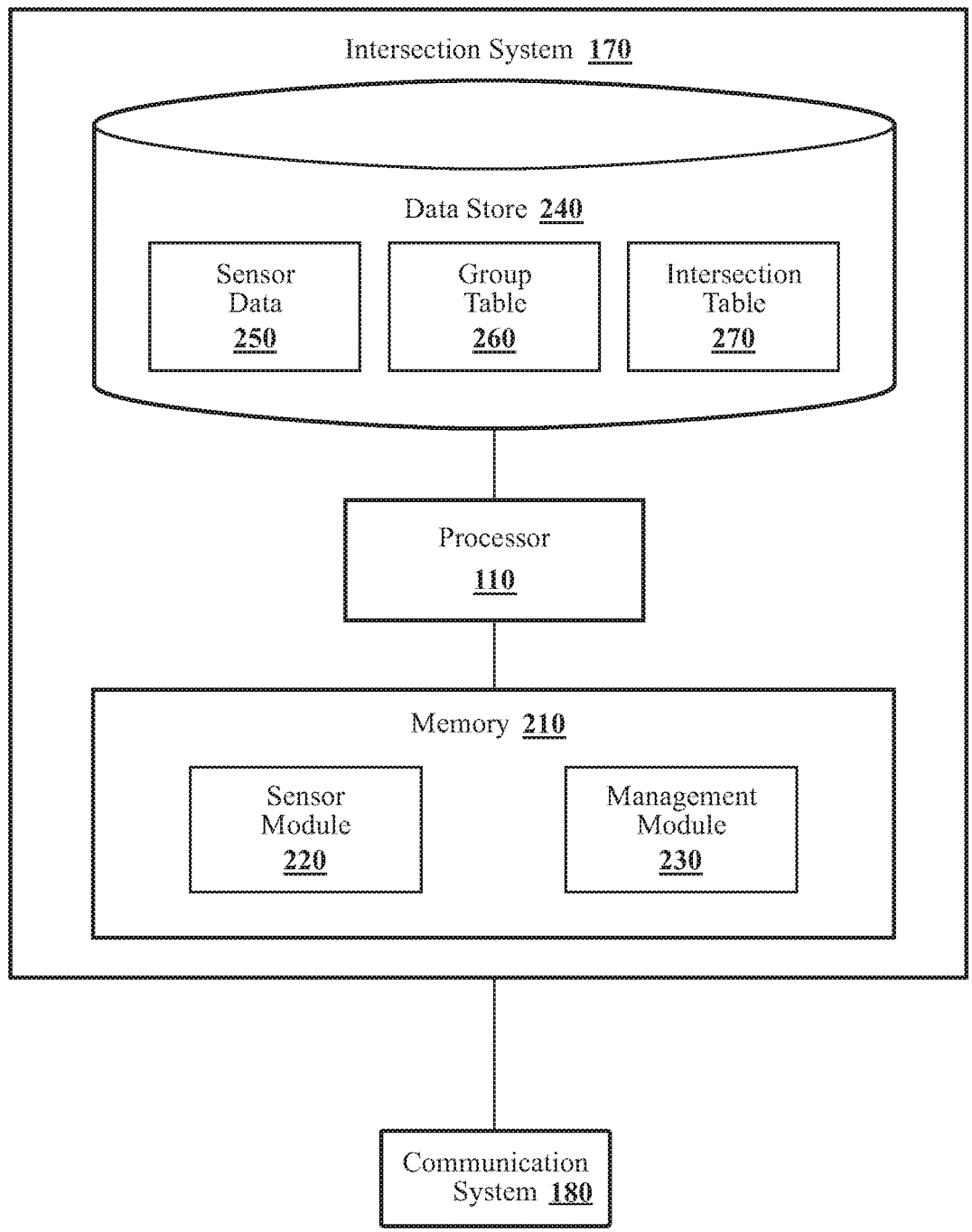
FIG. 2 illustrates one embodiment of an intersection system associated with improving the determination of right-of-ways.

With reference to FIG. 2, one embodiment of the intersection system 170 is further illustrated. The intersection system 170 is shown as including a processor 110 from the vehicle 100 of FIG. 1. Accordingly, the processor 110 may be a part of the intersection system 170, the intersection system 170 may include a separate processor from the processor 110 of the vehicle 100 or the intersection system 170 may access the processor 110 through a data bus or another communication path. In further aspects, the processor 110 is a cloud-based resource. Thus, the processor 110 may communicate with the intersection system 170 through a communication network or may be co-located with the intersection system 170. In one embodiment, the intersection system 170 includes a memory 210 that stores a sensor module 220 and a management module 230. The memory 210 is a random-access memory (RAM), read-only memory (ROM), a hard-disk drive, a flash memory, or other suitable memory (either volatile or non-volatile) for storing the modules 220 and 230 and/or other information used by the intersection system 170. The modules 220 and 230 are, for example, computer-readable instructions within the physical memory 210 that, when executed by the processor 110, cause the processor 110 to perform the various functions disclosed herein.

Figure 3:
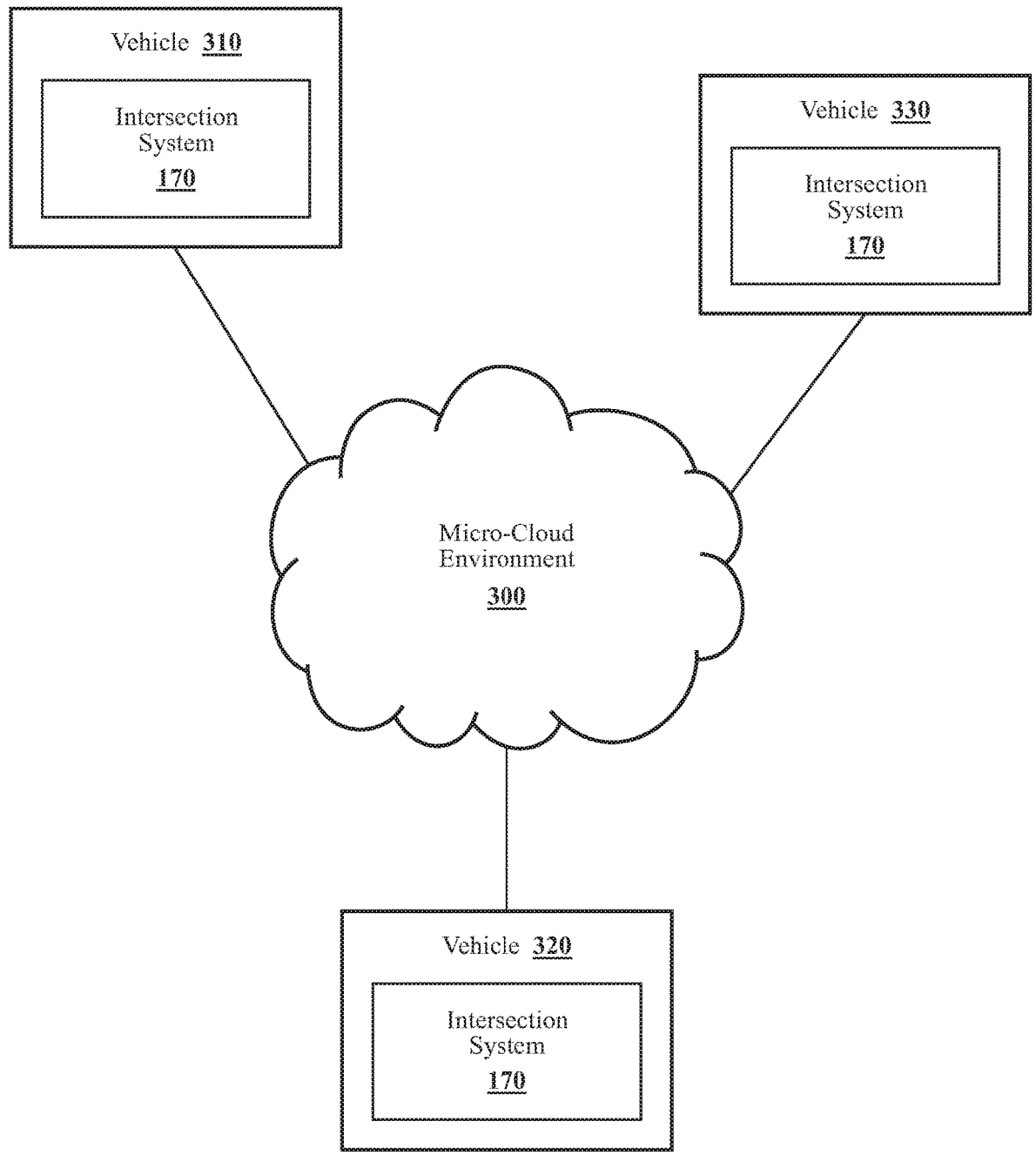
FIG. 3 illustrates a diagram of an intersection system within a micro-cloud environment.

As previously noted, the intersection system 170 may be further implemented within the vehicle 100 as part of a micro-cloud based system that functions within a micro-cloud environment 300, as illustrated in relation to FIG. 3. That is, for example, the intersection system 170 may acquire sensor data 250 from various entities, such as other vehicles implementing separate instances of the intersection system 170. In one or more approaches, the micro-cloud environment 300 may facilitate communications between multiple different vehicles to determine priorities for proceeding through a common traffic navigation point (e.g., an intersection) within an area of the micro-cloud.

Accordingly, the intersection system 170 within the micro-cloud environment 300 may communicate with various entities (e.g., vehicles 310, 320, and 330) that are within a same geographic area (e.g., within a defined distance of an intersection). In one approach, the intersection system 170 collects the sensor data 250 from components or separate instances of the system 170 that are integrated with the vehicles 310-330. Thus, the intersection system 170 may collect data locally from a respective vehicle and also from other vehicles communicating within the micro-cloud. While FIG. 3 focuses on vehicles communicating in the micro-cloud 300, it should be appreciated that any entity operating on a roadway and subject to right-of-way laws may participate within the micro-cloud so long as the entity is capable of communicating within the micro-cloud environment 300.

In a further aspect, the entities that implement the intersection system 170 within the micro-cloud environment 300 may vary beyond transportation-related devices and encompass mobile devices (e.g., smartphones), and other such devices that may be carried by an individual within a vehicle, and thereby can function in cooperation with the vehicle. Thus, the set of entities that function in coordination with the micro-cloud environment 300 may be varied.

The micro-cloud environment 300 itself, as previously noted, is a dynamic environment that comprises micro-cloud members that are routinely migrating into and out of an area of traffic for which the micro-cloud is facilitating determinations of right-of-way. In general, the area, as discussed herein, is associated with an intersection of two roads characterized by a four-way stop. The four-way stop is defined according to an inanimate stop sign (as opposed to an active traffic signal) at each entrance to the intersection for controlling the vehicles. Thus, each separate vehicle, according to local law, must generally stop prior to proceeding into and through the intersection. Furthermore, as used herein, right-of-way refers to which vehicle has the right to proceed into the intersection. The right-of-way corresponds with a time of arrival at the intersection. That is, the first entity to arrive at the intersection is the entity with the priority/right-of-way to proceed through the intersection.

It should be appreciated that while the intersection of two roads is discussed, the noted approach may function in relation to other configurations of roadways, such as a three-way stop, a five-way stop, and so on. Additionally, as used herein, the area associated with the intersection is an area that extends beyond the intersection itself to include approaching segments of roadway. The particular distance to which the area extends may depend on specific characteristics of the intersection and associated roadways, such as a number of lanes, speed limits, and/or other defining characteristics. In any case, the area associated with the micro-cloud extends a defined distance away from the intersection in order to establish communications with new micro-cloud members as the micro-cloud members are approaching the intersection.

Continuing with FIG. 2 and a general embodiment of the intersection system 170 from the perspective of the vehicle 100, in one or more arrangements, the sensor module 220 includes instructions that function to control the processor 110 to acquire the sensor data 250. In at least one aspect, the sensor module 220 acquires the sensor data 250 about aspects in a surrounding environment of the vehicle 100 to facilitate the operation of various systems of the vehicle 100, such as the autonomous driving module 160 (e.g., automated driving assistance systems (ADAS), semi-autonomous systems, fully autonomous systems, etc.), a navigation application, and so on. In further instances, the sensor module 220 acquires the sensor data 250 about the operation of the vehicle 100 itself (e.g., trajectory data, system status information, diagnostic data, etc.), and other relevant operating characteristics that may inform determinations within the micro-cloud environment 300.

Accordingly, the sensor module 220 generally includes instructions that cause the processor 110 to control one or more sensors of the vehicle 100 to generate an observation about the surrounding environment. Broadly, an observation, as acquired by the sensor module 220, is information about a particular roadway segment and objects present on the roadway segment as perceived by at least one sensor. Thus, the observation is generally a group of one or more data that are processed into a meaningful form.

The sensor module 220, in one embodiment, controls respective sensors of the vehicle 100 to provide the data inputs in the form of sensor data 250. The sensor module 220 may further process the sensor data 250 into separate observations of the surrounding environment. For example, the sensor module 220, in one approach, fuses data from separate sensors to provide an observation about a particular aspect of the surrounding environment. By way of example, the sensor data 250 itself, in one or more approaches, may take the form of separate images, radar returns, LiDAR returns, and so on. The sensor module 220 may derive determinations (e.g., location, trajectory, etc.) from the sensor data 250 and fuse the data for separately identified aspects of the surrounding environment, such as surrounding vehicles. The sensor module 220 may further extrapolate the sensor data 250 into an observation by, for example, correlating the separate instances of sensor data into a meaningful observation about the object beyond an instantaneous data point. For example, the sensor module 220 may track a surrounding vehicle over many data points to provide a trajectory.

Additionally, while the sensor module 220 is discussed as controlling the various sensors to provide the sensor data 250, in one or more embodiments, the module 220 can employ other techniques that are either active or passive to acquire the sensor data 250. For example, the sensor module 220 may passively sniff the sensor data 250 from a stream of electronic information provided by the various sensors or other modules/systems in the vehicle 100 to further components within the vehicle 100. Moreover, as noted, the sensor module 220 can undertake various approaches to fuse data from multiple sensors when providing the sensor data 250. Thus, the sensor data 250, in one embodiment, represents a combination of perceptions acquired from multiple sensors.

Of course, depending on the sensors that the vehicle 100 or other entity includes, the available sensor data 250 that the intersection system 170 can harvest may vary. As one example, according to a particular implementation, the vehicle 100 may include different types of cameras or placements of multiple cameras. In an additional aspect, the sensor module 220 may acquire aspects relating to a state of the vehicle 100 and/or observations from other members of the micro-cloud environment 300. For example, the sensor data 250 may further include IMU data from the vehicle 100, a GPS location of the vehicle, a current speed of the vehicle 100, and so on. Moreover, the observations that the sensor module 220 acquires from the micro-cloud members may include trajectory and position information about the micro-cloud member and/or trajectory and position information about a non-connected vehicle observed by the micro-cloud member. As such, the vehicle 100 may acquire information from direct observations and indirect observations in order to identify and account for entities that are approaching the intersection so that accurate assessments of right-of-ways may be undertaken.

When acquiring the sensor data 250, the sensor module 220 may acquire various electronic inputs that originate from the vehicle 100, which may be stored in a data store 240 of the intersection system 170 as the sensor data 250. Accordingly, in one embodiment, the intersection system 170 includes the data store 240. The data store 240 is, in one embodiment, an electronic data structure (e.g., a database) stored in the memory 210 or another electronic memory and that is configured with routines that can be executed by the processor 110 for analyzing stored data, providing stored data, organizing stored data, and so on. Thus, in one embodiment, the data store 240 stores data used by the modules 220 and 230 in executing various functions. In one embodiment, the data store 240 includes the sensor data 250, a group table 260, an intersection table 270, and/or other information that is used by the modules 220 and 230. It should be appreciated that while the data store 240 is shown as including the sensor data 250 and the group table 260, separate instances of the intersection system 170 may implement the data store 240 to include different sets of information.

Continuing with FIG. 2, in one embodiment, the management module 230 includes instructions that, when executed by the one or more processors 110, cause the one or more processors 110 to derive an assignment of right-of-ways indicating an order about how the set of vehicles may proceed through the intersection. Of course, to derive the assignments, the management module 230 uses the sensor data 250 that the sensor module 220 acquires locally about a surrounding environment of the vehicle 100 and the vehicle 100 itself, but also remote sensor data from other micro-cloud members.

Accordingly, the present discussion will shift to an explanation of membership in the micro-cloud prior to further explaining the derivation of assignments for right-of-ways. As an initial aspect, consider that the micro-cloud includes, in at least one approach, two different types of micro-cloud members. For example, the two different types may include a micro-cloud leader and a micro-cloud member. In general, the micro-cloud leader is responsible for deriving the final assignments but otherwise participates in the micro-cloud in the same capacity as other micro-cloud members.

Thus, the micro-cloud members generally maintain separate copies of the group table 260 and the intersection table 270. The intersection table 270, which will be discussed further subsequently, includes, in one or more approaches, information for maintaining awareness of positions of vehicles relative to the intersection. Thus, in one approach, the intersection table 270 includes a vehicle identifier, a priority indicator, time of arrival at the intersection, a time the vehicle was granted the right-of-way, a road segment identifier specifying the intersection location, and an expected time of arrival if the vehicle has not yet reached the intersection.

The group table 260 generally includes information identifying members of the group. In particular, the group table 260 may include vehicle identifiers and times the vehicles joined the micro-cloud. In a further approach, the group table 260 may further identify the micro-cloud leader from among the micro-cloud members. The micro-cloud leader administers the micro-cloud. That is, the micro-cloud leader determines the right-of-way assignments and communicates the right-of-way assignments to the micro-cloud members.

The micro-cloud provides one or more mechanisms for selecting the micro-cloud leader. In one approach, the current micro-cloud leader selects a next micro-cloud leader. For example, as the current micro-cloud leader is exiting an area of the intersection, the current micro-cloud leader selects the next micro-cloud leader according to a newest member of the micro-cloud. That is, the current micro-cloud leader promotes the newest micro-cloud member to act as the micro-cloud leader moving forward. In general, promoting the newest member to the micro-cloud leader promotes stability within the micro-cloud for a longer period of time by ensuring the micro-cloud leader is not changing more frequently than necessary. Of course, in further arrangements, the micro-cloud may implement further approaches to select the micro-cloud leader, such as by a group vote, a first member of the micro-cloud when initially formed, and so on. The handover process of the current micro-cloud leader promoting the next micro-cloud leader can include the current micro-cloud leader communicating the intersection table 270 and the group table 260 to the next micro-cloud leader as a way to hand-off the role of micro-cloud leader. The next micro-cloud leader may then acknowledge the hand-off and assume the role of micro-cloud leader. In any case, the micro-cloud leader functions to finalize the assignments and provide the assignments to members of the micro-cloud.

Continuing with the general operation of the micro-cloud, micro-cloud members, in at least one approach, periodically broadcast a beacon message that announces the presence of the micro-cloud. The beacon message, in one configuration, includes a message type (i.e., beacon), source ID, position and speed of the broadcasting vehicle, and an ID of the micro-cloud member that is broadcasting the beacon. Thus, by periodically broadcasting the beacon message, other vehicles entering the area of the intersection are informed about the micro-cloud and can then join to further facilitate determinations at the intersection. Thus, in response to the beacon message, a joining vehicle can communicate a response requesting membership in the micro-cloud. Either the micro-cloud member that originally broadcast the beacon message or the micro-cloud leader may approve the request and add the new micro-cloud member to the group table 260 and the intersection table 270. Furthermore, in at least one approach, the micro-cloud leader or another micro-cloud member communicates the group table 260 and the intersection table 270 to the new micro-cloud member. Thereafter, the new micro-cloud member may communicate with other members of the micro-cloud to determine right-of-ways for the intersection.

It should be appreciated that in further approaches, the process of adding a new member to the micro-cloud may include additional verification/security measures. For example, in various approaches, the micro-cloud members may authenticate a new member using a security handshake that involves authenticating a certificate of the new member or through another authentication pathway. In any case, while the process of adding a new member is generally described, it should be appreciated that further measures may be implemented to ensure the authenticity of members in the micro-cloud.

Continuing with FIG. 2, the intersection system 170 is generally implemented as separate instances within the micro-cloud members while the micro-cloud leader acts as an administrator of the micro-cloud that provides final determinations of the right-of-ways. Thus, as previously outlined, the separate members of the micro-cloud separately collect the sensor data 250 and communicate the sensor data 250 to other micro-cloud members or at least the micro-cloud leader. Accordingly, the management module 230 includes instructions to aggregate the sensor data 250 from the local vehicle 100 and the micro-cloud members and derive determinations about the right-of-ways therefrom.

In one approach, the management module 230 functions to initially identify information about separate vehicles that are approaching the intersection. Because the sensor data 250 includes observations of the micro-cloud members and also of other vehicles (e.g., non-connected vehicles) that are potentially not micro-cloud members, the management module 230 may distinguish between the separate vehicles and, in at least one aspect, fuse information about vehicles with duplicate observations. In general, the observations of the separate vehicles include a current position and a trajectory. In further aspects, the observations may also specify mitigating factors (i.e., aspects of the environment that may delay arrival at the intersection), data about characteristics of the vehicle, observed weather conditions, metadata (e.g., timestamp), and so on.

The management module 230 uses the observations of the vehicles to compute arrival times at the intersection. The arrival times (also referred to as a time of arrival) is an estimated time that is a function of the current position and trajectory of the separate vehicles. For example, for a given vehicle, the management module 230 may extrapolate the trajectory to estimate a time of arrival at the intersection according to the noted position. In a further aspect, the management module 230 may apply a more elaborate determination that involves changes in speed due to features of the roadway, such as decreases in speed when approaching the intersection, the presence of crosswalks, particular mitigating factors (e.g., the presence of pedestrians), and so on.

Whichever approach is undertaken, the management module 230 generates a time of arrival for each separate vehicle identified in the acquired observations. From a resulting list of arrival times for the vehicles that indicate an estimated arrival order for which vehicles arrive at the intersection first, the management module 230 generates the assignment. In general, the assignment simply specifies the right-of-ways according to the order of arrival at the intersection, as specified by the generated list. Thus, the micro-cloud leader may simply use the list that the management module 230 generates internally to instruct the micro-cloud members.

Alternatively, the micro-cloud leader may further receive provisional orders from the micro-cloud members that result from separate assessments by instances of the intersection system 170 in the separate micro-cloud members. As such, the management module 230 of the micro-cloud leader, in one approach, uses the provisional orders to determine a final assignment. In one embodiment, the management module 230 implements a majority voting process whereby the assignment is derived from voting on relative positions according to the provisional orders. That is, the provisional orders each include assigned right-of-ways as perceived by the respective micro-cloud member. The management module 230 uses the provisional orders as a voting mechanism to determine the final assignments. Thus, using the provisional orders of the micro-cloud members, including the micro-cloud leader, the management module 230 determines the consensus about which vehicles are perceived to arrive at the intersection first and defines the assignment according thereto.

In yet further aspects, the management module 230 within the micro-cloud leader may undertake a further analysis when generating the final assignment that includes, for example, weighting the provisional orders according to a reliability of respective micro-cloud members. That is, because different micro-cloud members may include different suites of sensors and thus may provide observations at differing levels of accuracy, the management module 230 may weigh the provisional orders according to known reliabilities associated with the separate micro-cloud members. This additional information about the micro-cloud members may be acquired over time from comparisons of observations and/or as part of an initial request to join the micro-cloud (e.g., the joining vehicle indicates software and hardware configurations). In any case, the management module 230 derives the assignments as a mechanism for facilitating safe and efficient travel through the intersection and to account for micro-cloud members and also non-connected vehicles.

The management module 230 further includes instructions to provide the assignment to micro-cloud members. The assignment generally takes the form of the intersection table 270. Thus, in one approach, the management module 230 provides the assignment by electronically communicating the assignment to the micro-cloud members over a wireless medium embodied by the micro-cloud. Thus, the micro-cloud leader, in at least one approach, broadcasts, multi-casts, or directly communicates the assignment to the micro-cloud members. The management module 230 may communicate the assignment of right-of-ways periodically in order to maintain updated intersection tables 270 with the micro-cloud members. In one approach, the management module 230 may communicate the assignment according to various events, such as a vehicle reaching the intersection, collection of observations from the micro-cloud members, and so on.

The management module 230, upon receiving the assignment, may display the assignment to an operator of a respective vehicle (e.g., vehicle 100, vehicle 310, etc.). In further embodiments, the management module 230 conveys the assignment to an autonomous driving module 160. The autonomous driving module 160 may function to at least partially control the vehicle 100. Thus, the autonomous driving module 160 can apply the assignment when arriving at the intersection and determining when to proceed. Therefore, the intersection system 170 broadly functions to determine which vehicle has the right-of-way at the intersection and thereby facilitates operation of vehicles in the micro-cloud and, by proxy, other non-connected vehicles through the intersection.

Figure 4:
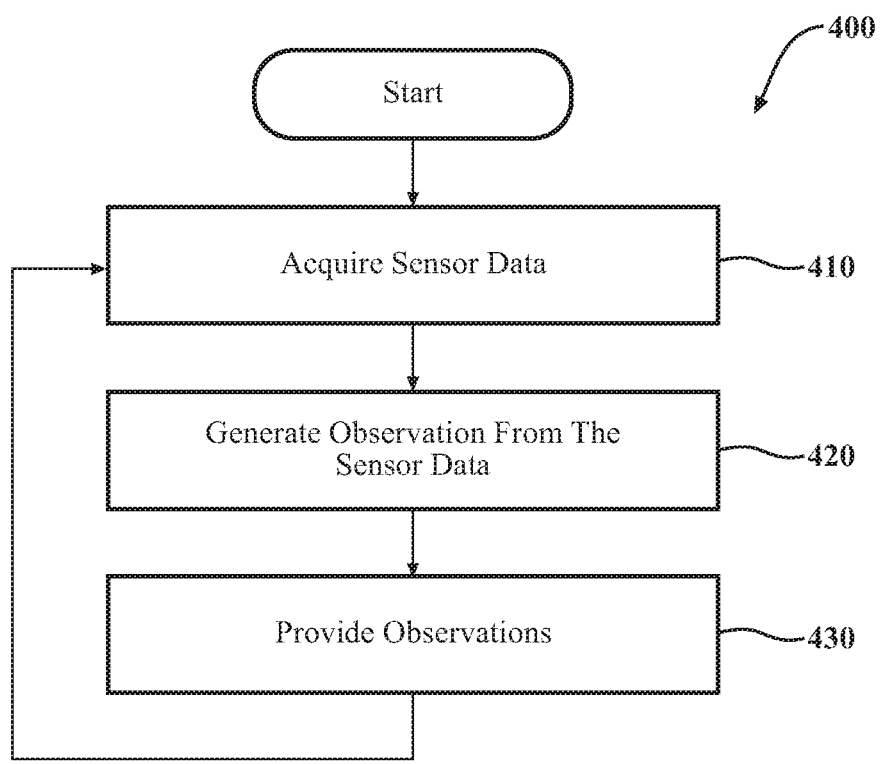
FIG. 4 is a flowchart illustrating one embodiment of a method associated with generating observations within a micro-cloud.

Additional aspects of using a micro-cloud to facilitate determinations of right-of-way at an intersection will be described in relation to FIG. 4 and subsequent figures. FIG. 4 illustrates a flowchart of a method 400 that is associated with providing observations within a micro-cloud environment. Method 400 will be discussed from the perspective of the intersection system 170 of FIGS. 1-2 as implemented by an entity, such as vehicle 100, that is participating as a member in a micro-cloud. While method 400 is discussed in combination with the intersection system 170, it should be appreciated that the method 400 is not limited to being implemented within the intersection system 170 but is instead one example of a system that may implement the method 400. Furthermore, while the method is illustrated as a generally serial process, various aspects of the method 400 can execute in parallel to perform the noted functions.

At 410, the sensor module 220 acquires the sensor data 250 from the vehicle 100. As previously noted, the sensor data 250 includes information about the vehicle 100 itself and also includes information about the surrounding environment of the vehicle 100. Accordingly, in addition to basic information about the location and trajectory of the vehicle 100, the sensor data 250 that is locally acquired may also include information about a road condition, objects that are proximate to the road, and objects that are present on the road, such as other vehicles, pedestrians, etc.

At 420, the sensor module 220 generates observations from the sensor data 250. In one embodiment, the sensor module 220 executes one or more routines (e.g., machine learning algorithms) to perform instance segmentation, classification, localization, trajectory determination, and so on. The sensor module 220 may associate the separate determinations with particular instances of objects in order to form observations about the objects. By way of example, the sensor module 220 may identify a vehicle and generate the observation by further identifying characteristics of the vehicle, such as at least a position and a trajectory. In further aspects, the sensor module 220 may generate additional determinations, such as a type of vehicle, mitigating factors that may slow the progress of the vehicle (e.g., pedestrians, potholes, construction, etc.). In either case, the sensor module 220 generates the observation from the sensor data 250 in order to provide awareness of the surrounding environment and aspects that may influence right-of-ways at the intersection. Moreover, while observations of the surroundings are one aspect, the sensor module 220 also generates observations about the vehicle 100 itself. Thus, the sensor module 220 uses information from the sensor data 250 to identify a position and trajectory of the vehicle 100. As with the above noted observations, the sensor module 220 may also generate the observation of the vehicle to include the noted additional characteristics.

At 430, the sensor module 220 provides the observations. In general, the sensor module 220 communicates the observations to at least the micro-cloud leader. In further aspects, the sensor module 220 may provide the observations to all of the micro-cloud members so that each separate member can separately derive determinations about the right-of-ways at the intersection.

Figure 5:
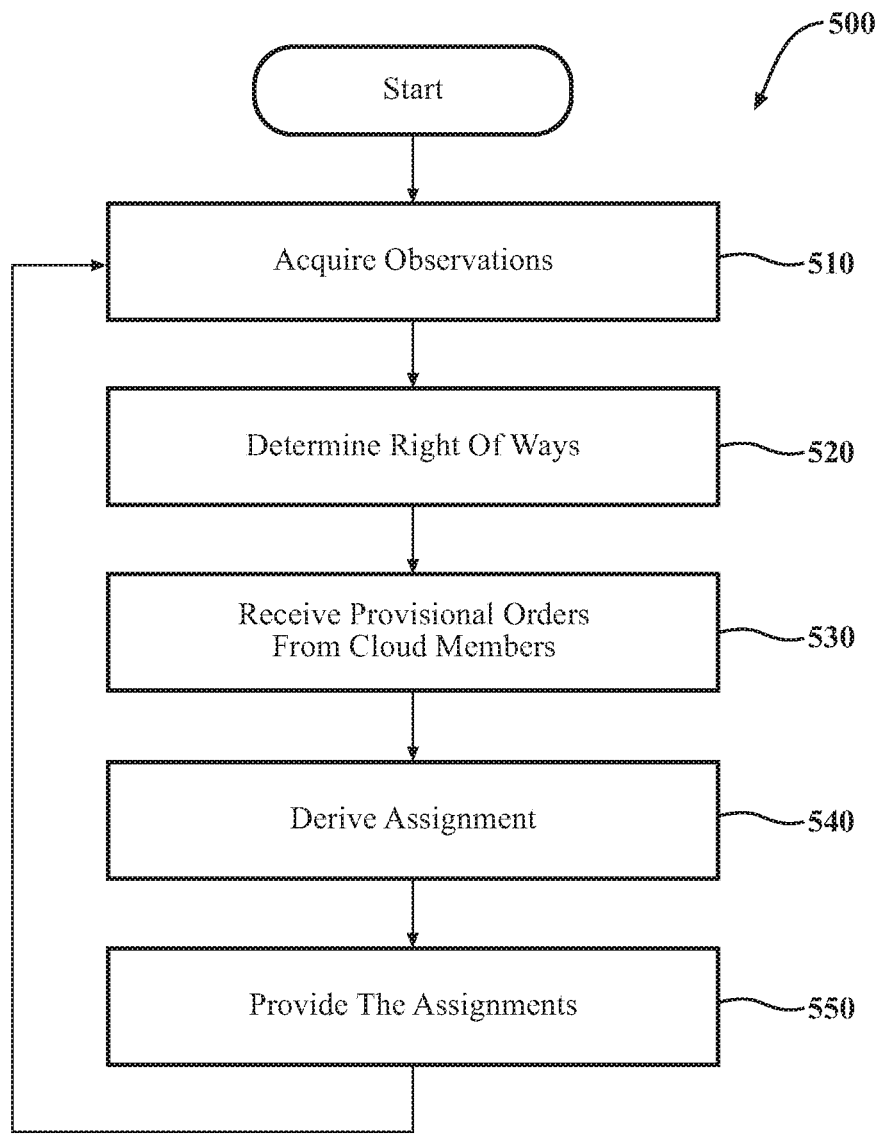
FIG. 5 is a flowchart illustrating one embodiment of determining assignments for right-of-ways using a micro-cloud.

FIG. 5 illustrates a flowchart of a method 500 that is associated with generating right-of-way determinations in a micro-cloud environment. Method 500 will be discussed from the perspective of the intersection system 170 of FIGS. 1-2 as implemented by a vehicle, such as the vehicle 100. While method 500 is discussed in combination with the intersection system 170, it should be appreciated that the method 500 is not limited to being implemented within the intersection system 170 but is instead one example of a system that may implement the method 500. Furthermore, while the method is illustrated as a generally serial process, various aspects of the method 500 can execute in parallel to perform the noted functions.

At 510, the intersection system 170 acquires the observations from the sensor data 250. As outlined previously in relation to method 400, the intersection system 170 in the various micro-cloud members communicate the observations to at least the micro-cloud leader. Additionally, the micro-cloud leader also generates local observations about the micro-cloud leader and the surrounding environment. Accordingly, the intersection system 170 aggregates the observations in order to generate a dataset from which the management module 230 can derive determinations.

At 520, the management module 230 determines right-of-ways from the observations. In one embodiment, the management module 230 computes arrival times at the intersection for the vehicles represented in the observations. As noted, the set of vehicles that are included in the observations may extend beyond vehicles that are members of the micro-cloud to include observed vehicles that are not connected with the micro-cloud. Accordingly, the management module 230 computes arrival times according to at least the position and trajectory for the set of vehicles. From the arrival times, the management system can order the vehicles into right-of-way assignments according to the soonest to the last to arrive. In this way, the management system can generate the assignment according to the arrival order for the set of vehicles at the intersection. As noted previously, the arrival order may be generated as a provisional ordering that is used by each micro-cloud member as a way to vote for which vehicle has the right-of-way in the order.

Furthermore, the management module 230, in at least one configuration, computes arrival times according to one or more mitigating factors that influence progress of the set of vehicles toward the intersection. That is, where an observation includes additional information about aspects of the environment that may ultimately delay the progress of a vehicle, the management module 230 can adjust the arrival time according to the mitigating factor. The management module 230 may include a table with assigned delay times for the different mitigating factors that the management module 230 adds to the arrival times or may dynamically determine possible delays. In any case, the management module 230 can adjust the arrival times in order to more accurately predict the provisional orders. By way of example, the mitigating factors can include dynamic objects obstructing a path to or in the intersection (e.g., obstacles, pedestrians, animals, etc.) and static features (e.g., potholes, crosswalks, etc.) of a roadway along the path to or in the intersection.

In a further aspect, the management module 230 may also consider mitigating factors that delay progress through the intersection. For example, once the intersection system 170 provides the assignment assigning the right of a way to a particular vehicle, the management module 230 may suspend the right of way for the vehicle when a mitigating factor, such as a pedestrian delays progress of the vehicle through the intersection. For example, a next vehicle may be given priority while the original vehicle waits for the mitigating factor (i.e., the pedestrian) to clear in order to maintain efficient progress of the set of vehicles through the intersection.

At 530, the management module 230 receives provisional orders from the micro-cloud members of the micro-cloud. It should be appreciated that while receiving is discussed, various members first transmit the provisional orders to the micro-cloud leader. As such, the management module 230 of the micro-cloud leader receives the provisional orders in order to proceed with deriving a final determination about the right-of-way at the intersection.

At 540, the management module 230 derives an assignment of right-of-ways indicating an order about how the set of vehicles may proceed through the intersection. In one embodiment, the management module 230 uses the provisional orders as votes from the micro-cloud members about the order of right-of-way assignments at the intersection. Accordingly, the management module 230 considers the provisional orders as votes about positions in the order and tallies the provisional orders to determine an order for the assignment. Various approaches to the majority voting may be undertaken by the management module 230. For example, the management module 230 may assign values to different positions in the order so as to accrue "votes" for vehicles at different positions. The management module 230, in the noted example, may then determine the assignments according to accrued votes for each vehicle. The final assignment that the management module 230 generates at 540 may then control the right-of-way through the intersection.

At 550, the management module 230 provides the assignment to current members of the micro-cloud. As outlined previously, the management module 230 provides the assignment by electronically communicating the assignment over the micro-cloud. Separate vehicles that are members of the micro-cloud may use the assignment differently. For example, in one approach, the intersection system 170 displays the assignment or an indication of when the vehicle has the right-of-way on a display within the vehicle so that an operator may control the vehicle to proceed through the intersection in turn. As noted otherwise, when the vehicle is an autonomous or semi-autonomous vehicle, the autonomous driving module 160 may use the assignment to further awareness about when to proceed through the intersection. In this way, the intersection system 170 improves the safety and efficiency of vehicles navigating intersections through the use of a micro-cloud.

Figure 6:
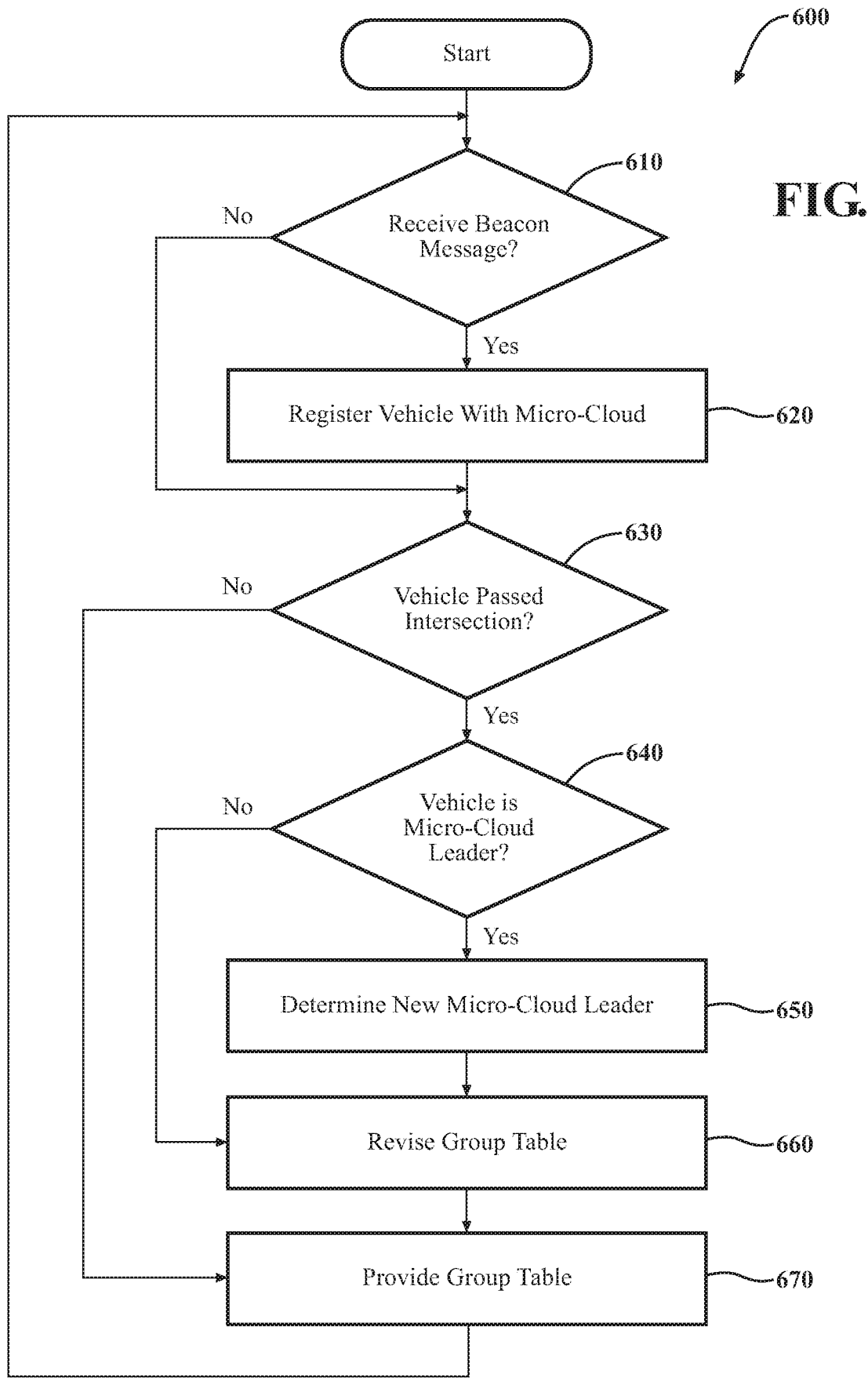
FIG. 6 is a flowchart illustrating one example of a method for managing membership in a micro-cloud.

FIG. 6 illustrates a flowchart of a method 600 that is associated with maintaining a micro-cloud at an intersection. Method 600 will be discussed from the perspective of the intersection system 170 of FIGS. 1-2 as implemented by a vehicle, such as the vehicle 100. While method 600 is discussed in combination with the intersection system 170, it should be appreciated that the method 600 is not limited to being implemented within the intersection system 170 but is instead one example of a system that may implement the method 600. Furthermore, while the method is illustrated as a generally serial process, various aspects of the method 600 can execute in parallel to perform the noted functions.

At 610, the intersection system 170 monitors for a beacon message from a local micro-cloud. The beacon message functions to engage new vehicles entering an area of the intersection to announce and enroll the new vehicles into the micro-cloud. If a message is received and the associated vehicle is not already a member of the micro-cloud, then the intersection system 170 proceeds to register with the micro-cloud at 620. Otherwise, the intersection system 170 proceeds to block 630.

In a further approach, the intersection system 170 may additionally or alternatively use geofencing to initiate a registration process with the micro-cloud. For example, the intersection system 170 may store a map of intersections at which micro-clouds facilitate right-of-way determinations. Thus, the intersection can monitor a location of the vehicle 100 in relation to the geofenced areas around the intersections. Upon entering a geofenced area, the intersection system 170 can initiate registration with a local micro-cloud for the particular area.

At 620, the intersection system 170 registers the vehicle 100 with the micro-cloud by communicating at least general identifying information about the vehicle 100 along with, for example, a current position and trajectory to a micro-cloud leader or other device that is registering the new vehicle. Upon providing the enrollment communication, the vehicle 100 is a member of the micro-cloud and may begin communicating with the micro-cloud members.

At 630, the intersection system 170 monitors for whether the vehicle 100 has passed through the intersection. If so, then the intersection system 170 will update the group table 260. Otherwise, the group table 260 is provided in the current form.

At 640, the intersection system 170 monitors for whether the vehicle that is passing through the intersection is the micro-cloud leader. If so, then the intersection system 170 hands-off the role as leader of the micro-cloud by, for example, electing a new micro-cloud leader as the most recent addition to the group table 260 at 650. Otherwise, at 660, the intersection system 170 revises the group table 260 to reflect the change in membership of the micro-cloud.

At 670, the intersection system 170 provides the group table 260. In one embodiment, the intersection system 170 electronically communicates the group table 260 to the members of the micro-cloud. In various implementations, the intersection system 170 may communicate the group table 260 periodically or whenever there is a change in the group membership. In this way, the intersection system 170 facilitates a dynamic ad hoc network to support the disclosed functions.

Figure 7:
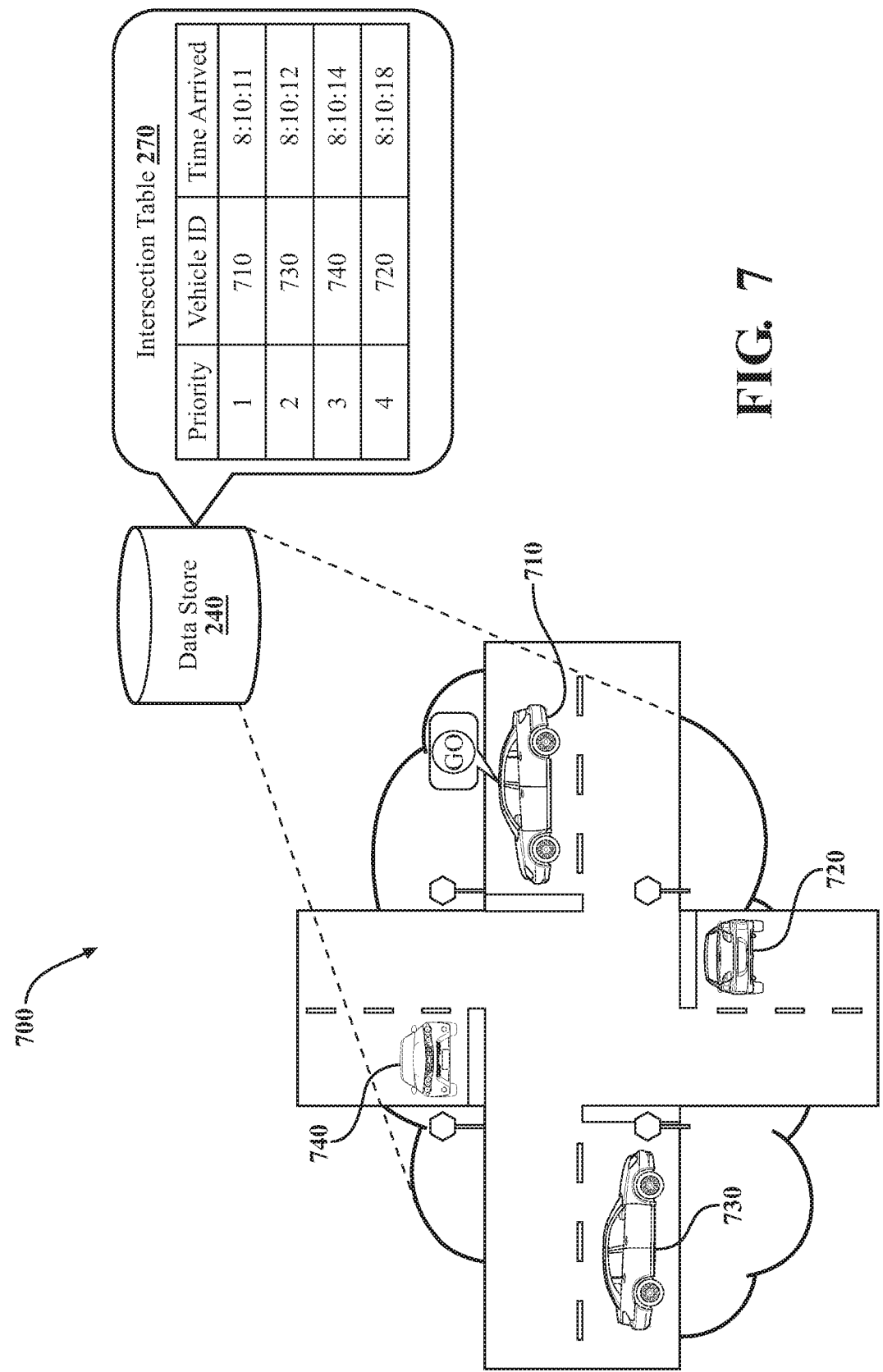
FIG. 7 is an illustration of an intersection and an intersection table.

As a further explanation of the intersection system 170 and operation of the micro-cloud, reference will now be made to FIGS. 7-8. FIG. 7 illustrates an example intersection 700 along with an example of the intersection table 270. As illustrated in FIG. 7, the micro-cloud includes four separate members that are vehicles 710, 720, 730, and 740. Separate instances of the intersection system 170 in the vehicles 710, 720, 730, and 740 maintain the micro-cloud at the intersection. As shown in the example intersection table 270, the intersection system 170 facilitates communications between the micro-cloud members to derive determinations about when vehicles arrived or are estimated to have arrived at the intersection. From this time of arrival listing, the intersection system 170 may sort the table according to arrival time and define the priorities for the right-of-ways that are the assignments.

Figure 8:
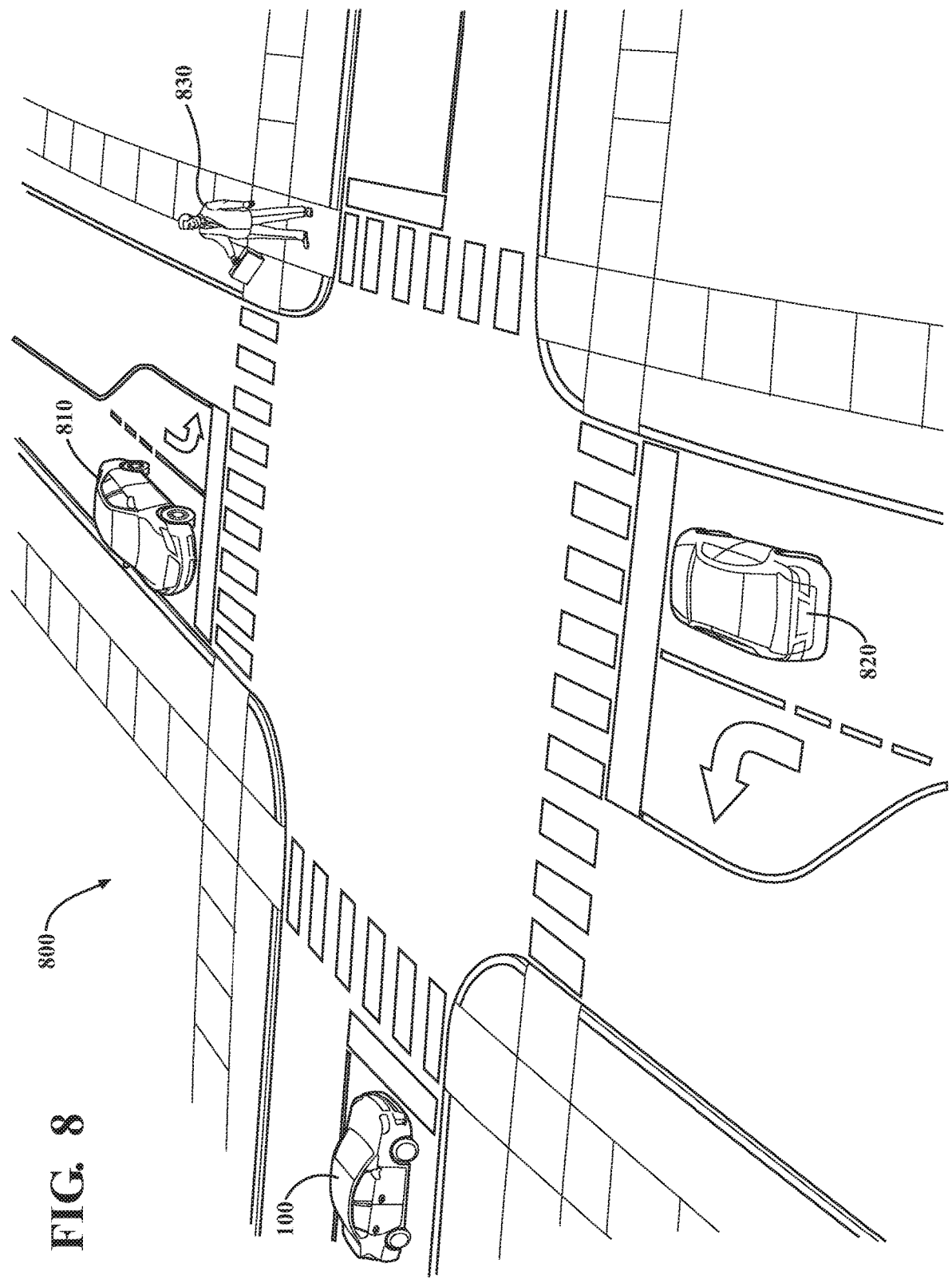
FIG. 8 is a diagram illustrating one example of an intersection.

FIG. 8 illustrates a further example of an intersection 800 at which the micro-cloud may be employed. As shown in FIG. 8, the vehicle 100, vehicle 810, and vehicle 820 are approaching the intersection 800. Thus, the intersection system 170 within the respective vehicles that are micro-cloud members functions to provide communications between the micro-cloud members in order to derive the intersection table 270 that specifies the assignments of right-of-ways. Assuming that the vehicle 100 is the micro-cloud leader and that the vehicle 810 is the first to arrive at the intersection 800, the intersection system 170 via the micro-cloud leader would assign priority to the vehicle 810 as having the right of way to proceed. However, with an awareness of the mitigating factor in the pedestrian 830 that may be crossing the street in front of the vehicle 810, the intersection system 170 may instead assign priority to the vehicle 820 to proceed since the pedestrian is likely to delay the vehicle 810. Accordingly, the intersection system 170 can act with knowledge about how the vehicles may proceed through the intersection 800 in order to provide an efficient assessment of priorities for controlling the intersection.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Of course, in further aspects, the vehicle 100 may be a manually driven vehicle that may or may not include one or more driving assistance systems, such as active cruise control, lane-keeping assistance, crash avoidance, and so on. In any case, "manual mode" means that all of or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangements, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangements, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such a case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include various types of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element, or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system, or a geolocation system.

The processor(s) 110, the intersection system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, and/or the autonomous driving module(s) 160 may control some or all of these vehicle systems 140 and, thus, may be partially or fully autonomous.

The processor(s) 110, and/or the autonomous driving module(s) 160 can be operatively connected to communicate with the various vehicle systems 140 and/or individual components thereof. For example, returning to FIG. 1, the processor(s) 110, the intersection system 170, and/or the autonomous driving module(s) 160 can be in communication to send and/or receive information from the various vehicle systems 140 to control the movement, speed, maneuvering, heading, direction, etc. of the vehicle 100. The processor(s) 110, the intersection system 170, and/or the autonomous driving module(s) 160 may control some or all of these vehicle systems 140.

The processor(s) 110, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, and/or the autonomous driving module(s) 160 can control the direction and/or speed of the vehicle 100. The processor(s) 110, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine the position and velocity of the vehicle 100. The autonomous driving module(s) 160 can determine the location of obstacles, obstacles, or other environmental features, including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the intersection system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source such as determinations from the sensor data. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-6, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules, as used herein, include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. An intersection system for improving right-of-way determinations at an intersection, comprising:
   one or more processors;
   a memory communicably coupled to the one or more processors and storing:
   a sensor module including instructions that, when executed by the one or more processors, cause the one or more processors to acquire, in a lead vehicle that is a cloud leader of a micro-cloud, observations about the intersection for a set of vehicles including at least one remote vehicle, wherein the set of vehicles are approaching the intersection, and wherein the remote vehicle and the lead vehicle are members of the micro-cloud; and
   a management module including instructions that, when executed by the one or more processors, cause the one or more processors to derive an assignment of right-of-ways indicating an order about how the set of vehicles may proceed through the intersection, including at least voting on the assignment of right-of-ways by the set of vehicles, and
   provide the assignment to at least the remote vehicle to control right-of-way at the intersection.

2. The intersection system of claim 1, wherein the set of vehicles includes at least one non-connected vehicle in addition to the at least one remote vehicle, and
   wherein the management module includes instructions to derive the assignment by i) computing arrival times at the intersection for the set of vehicles according to the observations and ii) generating the assignment according to an arrival order for the set of vehicles at the intersection that is based, at least in part, on the arrival times.

3. The intersection system of claim 1, wherein the management module includes instructions to derive the assignment including instructions to receive provisional orders from micro-cloud members of the micro-cloud, including at least the remote vehicle, and derive the assignment according to majority voting of the micro-cloud members that is based, at least in part, on the provisional orders from the micro-cloud members.

4. The intersection system of claim 1, wherein the management module includes instructions to derive the assignment including instructions to compute arrival times according to one or more mitigating factors that influence progress of the set of vehicles toward the intersection.

5. The intersection system of claim 4, wherein the mitigating factors include at least dynamic objects obstructing a path a vehicle of the set of vehicles, and static features of a roadway associated with the intersection.

6. The intersection system of claim 1, wherein the management module includes instructions to maintain the micro-cloud at the intersection by engaging new vehicles with the micro-cloud as the new vehicles approach the intersection, and handing-off a role as leader of the micro-cloud when a prior leader is exiting a region of the intersection, and wherein the micro-cloud is an ad hoc network established between the set of vehicles about the intersection.

7. The intersection system of claim 1, wherein the management module includes instructions to provide the assignment including instructions to electronically communicate the assignment to members of the micro-cloud to cause the members to proceed through the intersection according to the assignment, and
   wherein the micro-cloud is established between the set of vehicles without infrastructure devices.

8. The intersection system of claim 1, wherein the sensor module includes instructions to acquire observations including instructions to receive sensor data from at least one sensor of the cloud leader and from at least the remote vehicle, and
   wherein the observations include positions and trajectories of set of vehicles, and wherein the set of vehicles includes a non-connected vehicle that is not a member of the micro-cloud and does not participate in determining the assignment.

9. A non-transitory computer-readable medium storing instructions for improving right-of-way determinations at an intersection and that when executed by one or more processors cause the one or more processors to:
   acquire, in a lead vehicle that is a cloud leader of a micro-cloud, observations about the intersection for a set of vehicles including at least one remote vehicle, wherein the set of vehicles are approaching the intersection, wherein the remote vehicle and the lead vehicle are members of the micro-cloud;
   derive an assignment of right-of-ways indicating an order about how the set of vehicles may proceed through the intersection, including at least voting on the assignment of right-of-ways by the set of vehicles; and
   provide the assignment to at least the remote vehicle to control right-of-way at the intersection.

10. The non-transitory computer-readable medium of claim 9, wherein the set of vehicles includes at least one non-connected vehicle in addition to the at least one remote vehicle, and
    wherein the instructions to derive the assignment include instructions to i) compute arrival times at the intersection for the set of vehicles according to the observations and ii) generate the assignment according to an arrival order for the set of vehicles at the intersection that is based, at least in part, on the arrival times.

11. The non-transitory computer-readable medium of claim 9, wherein the instructions to derive the assignment include instructions to receive provisional orders from micro-cloud members of the micro-cloud, including at least the remote vehicle, and derive the assignment according to majority voting of the micro-cloud members that is based, at least in part, on the provisional orders from the micro-cloud members.

12. The non-transitory computer-readable medium of claim 9, wherein the instructions to derive the assignment include instructions to compute arrival times according to one or more mitigating factors that influence progress of the set of vehicles toward the intersection, and
  wherein the mitigating factors include at least dynamic objects obstructing a path of a vehicle of the set of vehicles, and static features of a roadway associated with the intersection.

13. The non-transitory computer-readable medium of claim 9, wherein the instructions to maintain the micro-cloud at the intersection include instructions to engage new vehicles with the micro-cloud as the new vehicles approach the intersection, and hand-off a role as leader of the micro-cloud when a prior leader is exiting a region of the intersection, and
  wherein the micro-cloud is an ad hoc network established between the set of vehicles about the intersection.

14. A method of improving right-of-way determinations at an intersection, comprising:
  acquiring, in a lead vehicle that is a cloud leader of a micro-cloud, observations about the intersection for a set of vehicles including at least one remote vehicle, wherein the set of vehicles are approaching the intersection, and wherein the remote vehicle and the lead vehicle are members of the micro-cloud;
  deriving an assignment of right-of-ways indicating an order about how the set of vehicles may proceed through the intersection, including at least voting on the assignment of right-of-ways by the set of vehicles; and
  providing the assignment to at least the remote vehicle to control right-of-way at the intersection.

15. The method of claim 14, wherein the set of vehicles includes at least one non-connected vehicle in addition to the at least one remote vehicle, and
  wherein deriving the assignment includes i) computing arrival times at the intersection for the set of vehicles according to the observations and ii) generating the assignment according to an arrival order for the set of vehicles at the intersection that is based, at least in part, on the arrival times.

16. The method of claim 14, wherein deriving the assignment includes receiving provisional orders from micro-cloud members of the micro-cloud, including at least the remote vehicle, and deriving the assignment according to majority voting of the micro-cloud members that is based, at least in part, on the provisional orders from the micro-cloud members.

17. The method of claim 14, wherein deriving the assignment includes computing arrival times according to one or more mitigating factors that influence progress of the set of vehicles toward the intersection, and
  wherein the mitigating factors include at least dynamic objects obstructing a path of a vehicle of the set of vehicles, and static features of a roadway associated with the intersection.

18. The method of claim 14, further comprising:
  maintaining the micro-cloud at the intersection by engaging new vehicles with the micro-cloud as the new vehicles approach the intersection, and handing-off a role as leader of the micro-cloud when a prior leader is exiting a region of the intersection, wherein the micro-cloud is an ad hoc network established between the set of vehicles about the intersection.

19. The method of claim 14, wherein providing the assignment includes electronically communicating the assignment to members of the micro-cloud to cause the members to proceed through the intersection according to the assignment.

20. The method of claim 14, wherein acquiring observations includes receiving sensor data from at least one sensor of the cloud leader and from at least the remote vehicle,
  wherein the observations include positions and trajectories of the set of vehicles, and wherein the set of vehicles includes a non-connected vehicle that is not a member of the micro-cloud and does not participate in determining the assignment.

\* \* \* \* \*